Aug. 21, 1951  LE R. CLARDY ET AL  2,565,121
CONTROL APPARATUS
Filed June 2, 1947  2 Sheets-Sheet 1
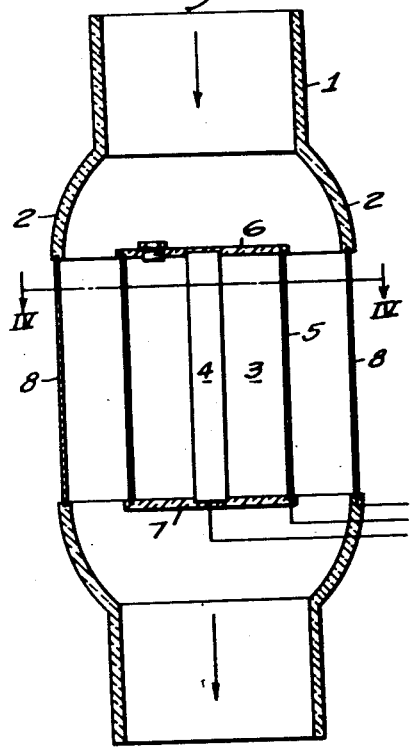
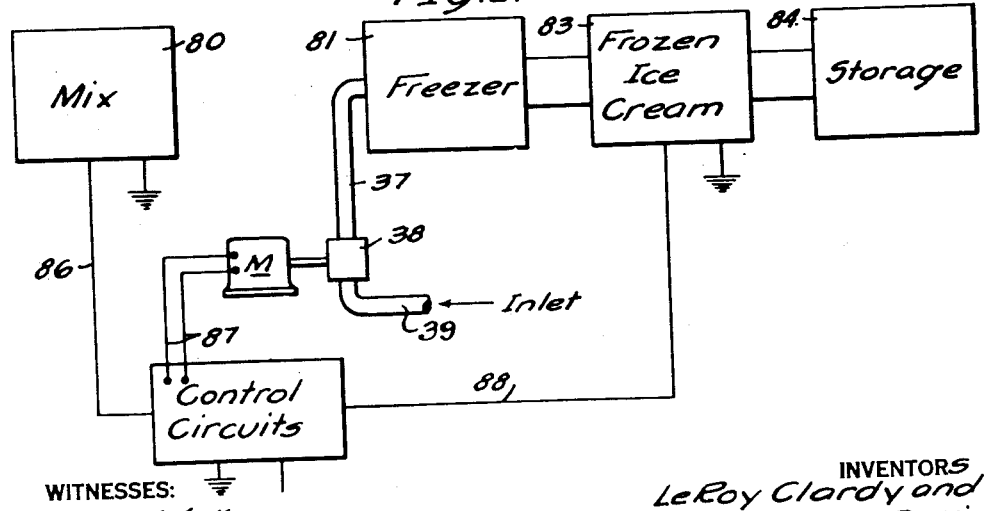
INVENTORS
LeRoy Clardy and
Thomas W. Dakin.
BY
Paul E. Friedemann
ATTORNEY
WITNESSES:
E. G. McCloskey
Nw. C. Groome Aug. 21, 1951  LE R. CLARDY ET AL  2,565,121
CONTROL APPARATUS
Filed June 2, 1947  2 Sheets-Sheet 2
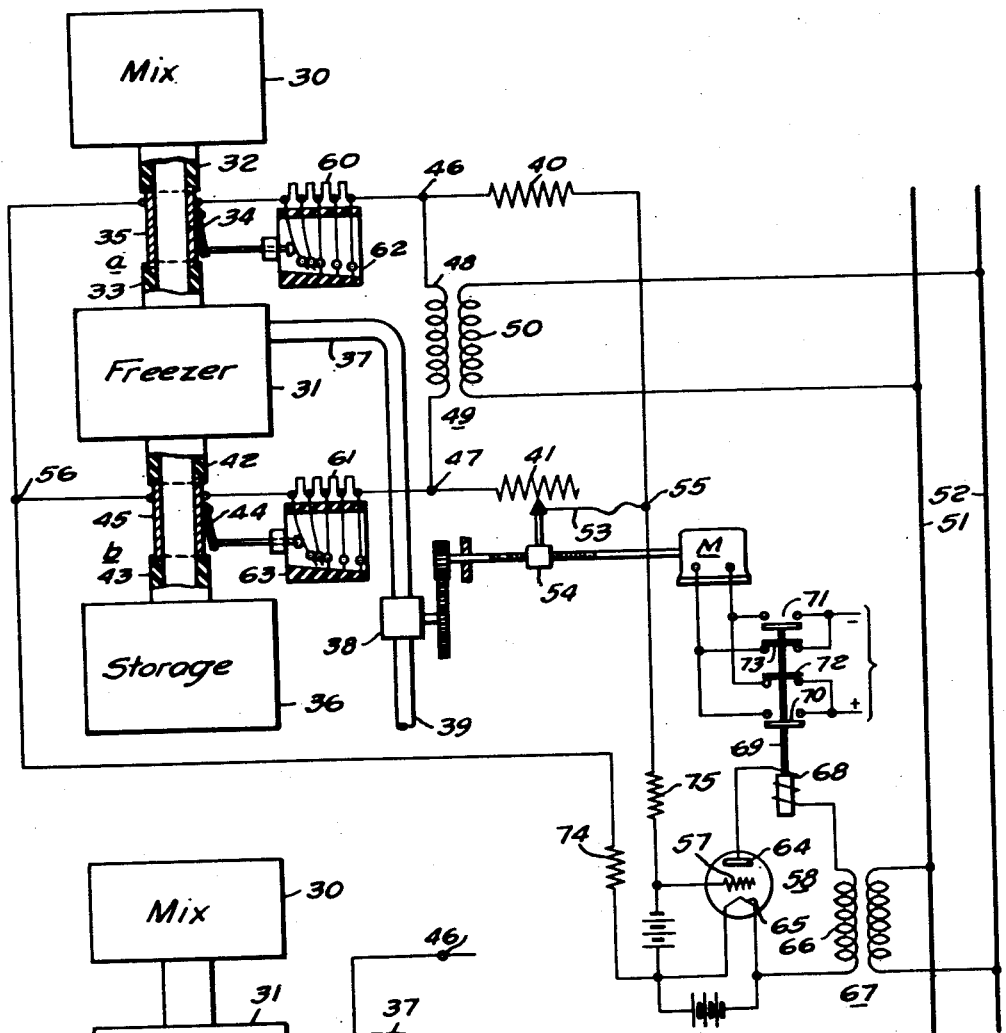
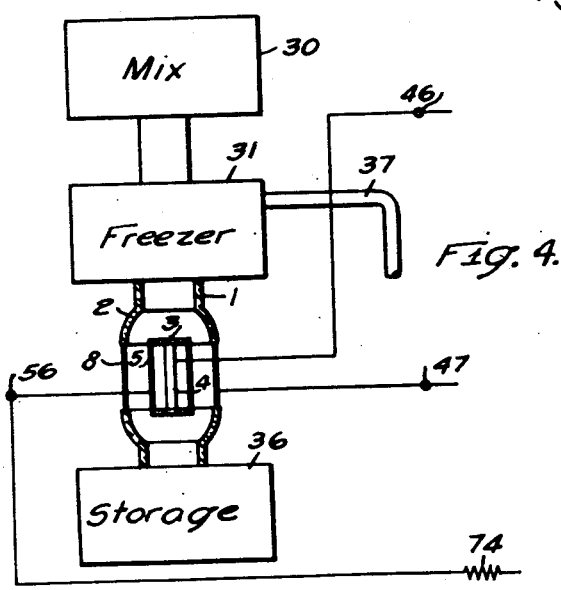
INVENTORS
LeRoy Clardy and
Thomas W. Dakin.
BY
Paul E. Friedemann
ATTORNEY Patented Aug. 21, 1951

2,565,121

UNITED STATES PATENT OFFICE 2,565,121

CONTROL APPARATUS

Le Roy Clardy, Chicago, Ill., and Thomas W. Dakin, Pittsburgh, Pa., assignors, by direct and mesne assignments, of one-half to Westinghouse Electric Corporation, East Pittsburgh, Pa., a corporation of Pennsylvania, and onehalf to Swift & Company, a corporation of Illinois Application June 2, 1947, Serial No. 751,720

4 Claims. (Cl. 62—114)

Our invention relates to electrical control systems and more particularly to control systems for measuring a characteristic of a material and for controlling the characteristic of the material being made, or processed, in manufacturing operations.

Our control systems have special usefulness in the manufacture of ice cream. It is to be noted that the manufacture of ice cream is a rather important industry in this country. According to reports of certain trade journals, it appears that between four and five hundred million gallons of ice cream are consumed annually in the United States. Our invention has an application in all commercial plants for the manufacture of ice cream and is thus of no secondary importance.

In all commercial ice creams, air is incorporated during the freezing period so that the finished product will have the desirable body and palatability. The amount of air thus incorporated is, in the trade, designated the "overrun." As used in the trade, this term is defined as the amount of incorporated air expressed as a volume percentage of the liquid entering the freezer. Thus, if, during a unit period, one hundred gallons of liquid base, which is called "mix," is pumped into a freezer and one hundred and ninety gallons are withdrawn, then ninety gallons of air has been added, and the overrun in this case is 90 per cent.

Deviations from a fixed overrun characteristic of a certain mix causes the body of the finished ice cream to be either too heavy or too light, the texture to be either too coarse or too flaky. No matter in what direction the deviation may be, the palatability is apt not to be so desirable. If too little air is incorporated, the product is excessively cold in the mouth, its body heavy, and its texture soggy. Too much air causes it to be frothy and snowy.

There is also an "economic angle" to the amount of overrun a manufacturer may tolerate in his product. If the overrun is always on the low side, the manufacturer may not be able to make a profit if his product is sold at competitive prices against competition that can sell at a low price because of a high per cent of overrun.

From the foregoing it is apparent that the per cent overrun is important, and it is, therefore, a broad object of our invention to measure and control the overrun in ice cream.

It is also another broad object of our invention to measure the per cent overrun of ice cream as it comes from a continuous freezer and, in a further aspect of the invention, to use the measurement to control the per cent overrun.

The problem of measuring and controlling the overrun or per cent air in ice cream resolves itself into finding a property of the aerated ice cream which is dependent upon the per cent of air in the ice cream, and is sufficiently independent of other variables so that spurious effects are minimized when some other ingredient or condition of the ice cream changes.

One specific object of our invention is to utilize the electrical conductivity of the aerated ice cream to measure and control the per cent air in the ice cream.

Another specific object of our invention is to compare the electrical resistance of a given amount of aerated ice cream to the resistance value of a like amount of mix to thus determine the overrun.

Other objects and advantages will become more apparent from a study of the following specification, and the accompanying drawings, in which:

Figure 1 is a diagrammatic showing of the elements involved in the manufacture of ice cream and the overrun control system in relation thereto;

Fig. 2 is a somewhat schematic showing of practical apparatus for automatically and continuously measuring and controlling overrun in ice cream;

Fig. 3 is a sectional side elevation of another form of an electrical conductivity measuring chamber for ice cream;

Fig. 4 is a sectional side elevational view of the measuring chamber of Fig. 3 and a diagrammatic showing of the arrangement of the measuring chamber shown in Fig. 3 in association with elements involved in the manufacture of ice cream and the control apparatus shown in Fig. 2.

Similar characters in the drawings refer to like structure.

In Fig. 1, the numeral 80 represents the tank containing the ice cream mix. Freezing of the ice cream mix is effected in freezer 81, the frozen product being indicated by the numeral 83. Frozen ice cream may be stored in storage tank 84. The mix is connected electrically through line 86 with control circuit 87, and frozen ice cream makes electrical connection therewith through line 88. Control circuit 87 furnishes current to regulator motor M, which controls valve 38 in air supply line 39, through which air is supplied to the freezer under pressure to provide the proper content, or overrun, in the ice cream.

The control circuit 87 is responsive to measurements of the electrical conductivity of the mix and frozen final product. The measurement of the electrical conductivity of the mix may be taken continuously as the mix is supplied to the freezer, as shown in apparatus represented in Fig. 2. Alternatively, a measurement of the electrical conductivity of a given sample of the mix may be continuously compared with a measurement of the frozen product while maintaining both at the same temperature, as illustrated in Fig. 4.

One embodiment of the invention is illustrated in Fig. 2, wherein a complete system of control is diagrammatically shown in part, and in sufficient detail for a clear understanding of the invention.

In Fig. 2 the tank 30 stores the ice cream mix containing all the ingredients that are pumped, by suitable pump means, not shown, to the continuous freezer 31. In transmitting the non-aerated matrix, or mix, from tank 30 to the freezer, the mix is passed through the sections 32 and 33 of insulating material constituting part of the conduit between the tank 30 and the freezer 31. The sections are provided with a pair of preferably parallelly disposed electrodes 34 and 35. These electrodes may have any configuration but preferably comprise a pair of either rectangular plates or circular discs of metallic material. The electrodes may be platinized, or may be silver, gold, or any other metal or alloy that is not subject to rusting or other deterioration in use.

The continuous freezer is operated by suitable motor means and refrigerating means to freeze the mix into ice cream and then, under pressure, drive the ice cream to the storage tank 36 or to packing cartons disposed at the discharge conduit from the freezer.

The freezer 31 is supplied with air under pressure from conduit 37. By suitably controlling the flow of air by means of valve 38, the air content, i. e., the overrun, may be readily controlled. The conduit 39 connects to a suitable air pump or pressure tank, not shown.

The conduit disposed between the freezer 31 and the storage tank is supplied with a section comprising insulating sections 42 and 43, and electrodes 44 and 45 corresponding in structure, dimensional spacing, and selection of materials in every respect to the elements 32 and 33, and 34 and 35, respectively.

We place the electrodes 34 and 35, and the electrodes 44 and 45 in a bridge circuit. In this bridge circuit, impedance 41 comprises one leg and impedance 40 comprises a second leg, and the electrodes 34 and 35, and 44 and 45, respectively, comprise the other two legs.

The bridge circuit is normally a balanced alternating-current bridge supplied with energy at the junctions 46 and 47 with alternating current from the secondary winding 48 of the transformer 49. The primary windings 50 are connected to the supply buses 51 and 52.

The adjustment of lead 53 by the traveling nut 54 is so chosen that when the overrun is at the desired value, the air pressure being supplied by conduit 37 to the freezer is at the proper value, and the electrodes 34 and 35 with reference to electrodes 44 and 45 are either at the same temperature or a known temperature differential, the bridge is balanced and junctions 55 and 56 are at the same potential, or the potential selected to place a bias on grid 57 of tube 58 so that this discharge tube does not break down or become conducting.

Since the electrodes 34 and 35 are in spaced relation to each other and the circuit is completed through the mix, these electrodes will carry a current that is a measure of the conductivity of the mix. The electrodes 44 and 45 are in spaced relation in the path of the frozen ice cream. The current these electrodes will carry is thus a measure of the conductivity of the aerated material, i. e., the conductivity of the ice cream containing the air.

An analysis of the problem shows that the resistance of the first, or $a$, pair of electrodes and mix will be:

$$R_a = \frac{KL_a}{A_a} \quad (1)$$

where $K$ is the specific resistance of the ice cream matrix—the mix—$L_a$ is the distance between the electrodes and $A_a$ is one-half of the sum of the facing areas of the electrodes.

The resistance of the second, or $b$, pair of electrodes and the aerated ice cream will be:

$$R_b = \frac{KL_b f}{A_b} \quad (2)$$

where $K$ is the same as in the first equation since the cream matrix is still the same, $L_b$ is the distance between the electrodes 44 and 45 and $A_b$ is one-half of the sum of their facing areas and $f$ is a factor dependent upon the per cent air, and schematically represents the increased effective conductance path.

Thus, the ratio of the two resistances becomes $$\frac{R_b}{R_a} = \frac{\frac{KL_b f}{A_b}}{\frac{KL_a}{A_a}} = \frac{A_a L_b f}{A_b L_a} \quad (3)$$

It will be noted that this ratio is independent of changes in the conductivity of the mix and can be measured, of course, by the ratio of the resistance arms on the other side of the bridge of balance. That is $$\frac{R_b}{R_a} = \frac{R_{41}}{R_{40}} \quad (4)$$

If the balancing of the bridge is so arranged that $R_{40}$ is kept constant, then $R_{41}$ will be proportional to the factor $f$.

In the discussion so far made no account was taken of changes in temperature or in difference in mean temperature between the points at $a$ and $b$. Difference in temperature from a known or adjusted differential will introduce a factor $(1+aT)$ into the Equation 3 above. If $T$, the temperature differential, were constant, there would be no effect on the measurements; but if $T_a$ and $T_b$ vary independently, which is usually the case, over wide ranges, it becomes necessary to provide temperature compensation.

This compensation we accomplish by the introduction of small variable resistances 60 and 61 in the legs including the electrodes. The resistance values of these resistors are changed automatically by the thermostatic devices 62 and 63. In each of these devices a bimetallic strip actuates some resistor section shunting means to alter the resistance in an opposite sense to the effect produced by temperature changes. In other words, the arrangement is calibrated so that the temperature gradient of the resistance at the electrodes is equal to the negative of the temperature gradient of resistance of the adjustable resistor.

It may be desirable to keep $$\frac{R_a}{R_b}$$

near unity, in which case the areas of the respective electrodes could be adjusted so that when multiplied by $f$ as in Equation 3, the ratio of the resistances is near unity for the desired value of overrun.

As long as the proper per cent of air content is maintained the potential at junctions 55 and 56 will remain fixed, but as soon as there is a deviation, the bias on grid 57 is changed to cause tube 58 to become conducting. As the tube 58 becomes conducting, an energizing circuit is established from the plate 64 to filament 65, the lower terminal of secondary winding 66 of the transformer 67, the actuating coil 68 of the reversing contactor 69 back to the plate 64.

Contactor 69 is thus operated to close contacts 70 and 71 to establish a circuit from the positive conductor through contacts 70, the motor M, and contacts 71 to the negative terminal. The motor M thus operates valve 38, through the transmission shown, to alter the supply of air to the freezer 31. The motor M also, through the actuation of the traveling nut 54, changes the position of lead 53 to rebalance the bridge.

When the bridge is balanced, the grid bias is altered so that tube 58 becomes non-conducting. The contactor drops to the position shown, thereby closing contacts 72 and 73. The motor M reverses to move the lead 53 toward its original position and the opening of valve 38 to the original position.

The resistance values of resistors 74 and 75 are selected large enough so that the tube circuit would have a negligible effect on balance of the bridge. For some applications an amplifier tube might be found necessary in front of the thyratron tube 58.

Since motor M operates either in one direction or the other direction and has no intermediate or off position, it is preferable to adjust and calibrate the equipment so that when contactor 69 is deenergized and the motor is run by the circuit through contacts 72 and 73, then the direction of operation of valve 38 will be such as to increase the air supply and the change in resistance value of 41 will be such to indicate such change in overrun.

In measuring the electrical conductivity of ice cream, it was found that the conductivity thereof varies greatly with small changes of temperature. Absolute values of conductivity are, therefore, determined under conditions of constant temperature. Similarly, when comparing the conductivity of two materials, the temperature is preferably adjusted to be the same.

The cell represented in Fig. 3 automatically adjusts the temperature of the two materials to be the same, and thus minimizing any error in the conductivity measurement due to temperature differences. Because of its structure, the chamber or container hereinafter described is only susceptible, for all practical purposes, to the resistance caused by the air in the ice cream.

The aforesaid cell is proposed to be used in a method involving a bridge in which the resistance in one arm is the ice cream mix and the resistance in the other arm is ice cream, as hereinafter more fully described.

In Fig. 3, the conduit 1 leading from a continuous freezer, not shown, is provided with an enlargement, or container 2 to receive the closed chamber, or container 3. This chamber 3 is disposed in fixed concentric relation to enlargement 2 and is provided with a central conducting electrode 4 and a cylindrical outer wall 5 comprising a second electrode. These two electrodes and the ends 6 and 7 constitute the closed chamber. This chamber contains a standard unfrozen mix.

The enlargement 2 is provided with a cylindrical electrode 8 forming the wall of enlargement 2 for a given axial length. The frozen aerated ice cream, moving down through conduit 1 in the direction indicated, thus moves between electrodes 5 and 8.

The cell described in Fig. 3 may, for example, take the place of electrodes 34 and 35, and electrodes 44 and 45, of the apparatus shown in Fig. 2. This substitution is shown in Fig. 4, wherein the cell is placed between the storage means 36 and the freezer 31. The cell is connected into the control circuit of Fig. 2 in such manner that electrodes 4 and 5, which carry the current measuring the conductivity of the mix, are connected to terminals 46 and 56, respectively, and correspond to electrodes 34 and 35 of Fig. 2. Similarly, electrodes 5 and 8 which are connected, respectively, to terminals 56 and 47 and which carry a current that is a measure of the aerated ice cream, correspond to electrodes 44 and 45. Thus, electrode 5 is common to electrodes 4 and 8, and corresponds to electrodes 35 and 45 of the apparatus shown in Fig. 2.

It is apparent, therefore, that the cell of Fig. 3 may be connected into the control circuit of Fig. 2, whereby to form elements of a Wheatstone bridge to operate the circuit.

While we have shown and described but few embodiments, we do not wish to be limited to the modifications shown and described, but wish to be limited only by the scope of the claims hereto appended.

We claim as our invention:

1. In a control system for measuring the overrun in ice cream, in combination, an ice cream freezer of the continuous type, means for continuously supplying air to the freezer while in operation to aerate the ice cream as it is being frozen, means responsive to the variation of the electrical conductivity of the aerated ice cream in relation to the unaerated ice cream mix for controlling the rate at which air is supplied to the continuous freezer.

2. In a system for measuring the overrun in ice cream, in combination, means for effecting measurement of the electrical conductivity of unaerated ice cream mix, means for effecting measurement of the conductivity of aerated ice cream, means for aerating the ice cream, and circuit means responsive to said measurements for automatically controlling of the aeration of said ice cream.

3. The process of controlling overrun in ice cream, which comprises separately measuring the electrical conductivity of aerated and unaerated ice cream mix, and controlling the input of air to the ice cream in response to variations in the measurements.

4. The process of measuring and controlling overrun in ice cream, which comprises separately measuring the electrical conductivity of aerated and unaerated ice cream mix, and electrically controlling the input of air to the ice cream in response to deviations of said measurements from a predetermined standard.

LE ROY CLARDY.
THOMAS W. DAKIN.

REFERENCES CITED

The following references are of record in the file of this patent:

UNITED STATES PATENTS

| Number | Name | Date |
|---|---|---|
| 1,145,509 | Pike et al. | July 6, 1915 |
| 1,450,023 | Edelman | Mar. 27, 1923 |
| 1,472,125 | Keeler | Oct. 30, 1923 |
| 1,678,591 | Fulweiler | July 24, 1928 |
| 2,045,381 | Elberty | June 23, 1936 |
| 2,270,732 | Jones | Jan. 20, 1942 |
| 2,370,609 | Wilson et al. | Feb. 27, 1945 |
| 2,396,420 | Hayward et al. | Mar. 12, 1946 |
| 2,415,585 | Genova | Feb. 11, 1947 |
| 2,422,873 | Wolfner | June 24, 1947 |
| 2,450,459 | Thomson | Oct. 5, 1948 |